Figure 1:
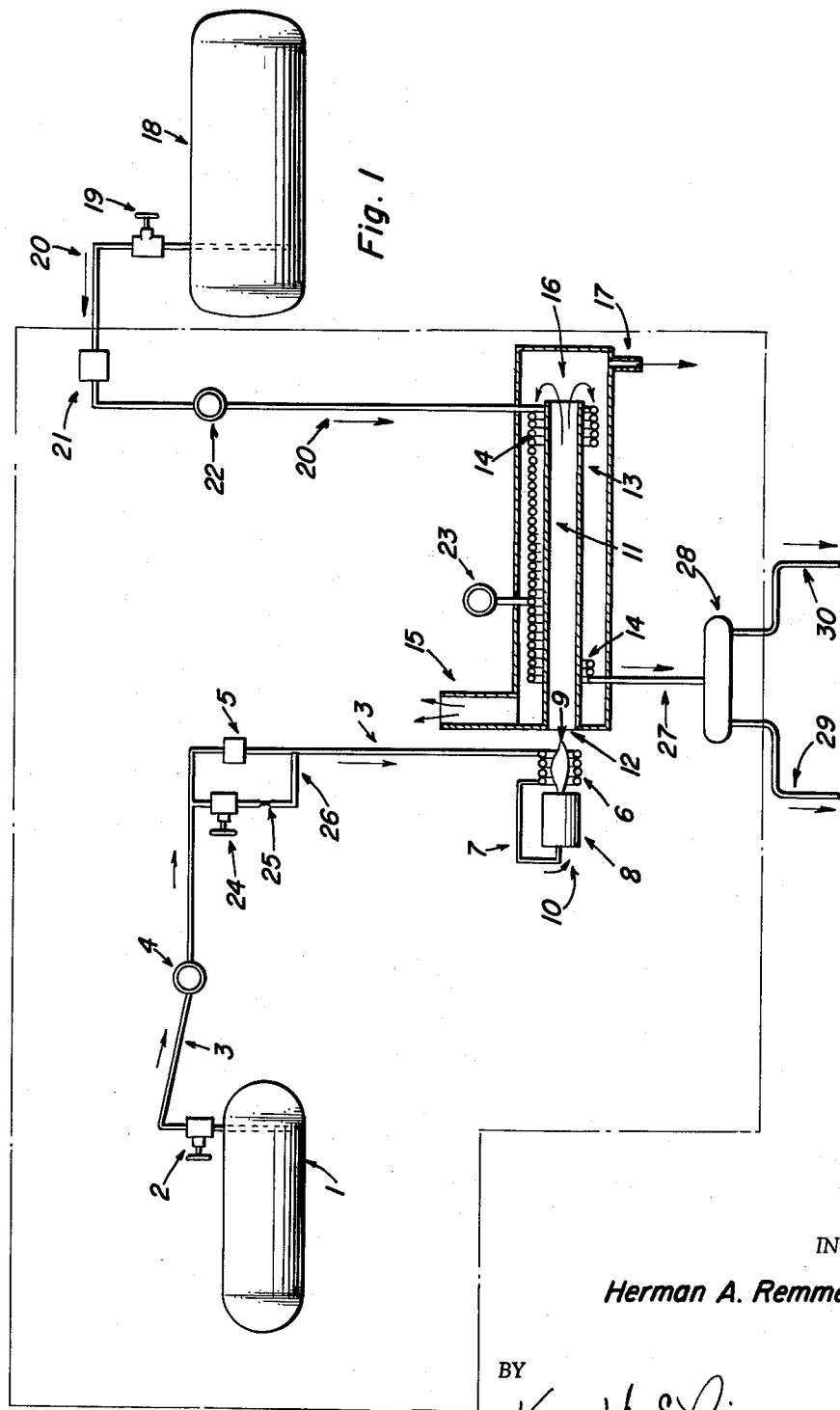

March 8, 1966  H. A. REMMERT  3,238,667
APPARATUS FOR DEFOLIATION BY VAPORIZING AND APPLYING AMMONIA
Filed May 29, 1963  3 Sheets-Sheet 2

INVENTOR
Herman A. Remmert

BY
ATTORNEY

INVENTOR
Herman A. Remmert

United States Patent Office 3,238,667
Patented Mar. 8, 1966

---

3,238,667
APPARATUS FOR DEFOLIATION BY VAPORIZING AND APPLYING AMMONIA
Herman A. Remmert, Memphis, Tenn., assignor to W. R. Grace & Co., New York, N.Y., a corporation of Connecticut
Filed May 29, 1963, Ser. No. 284,240
1 Claim. (Cl. 47—1)

This invention relates to the vaporization of liquid ammonia. In one specific aspect it relates to a portable ammonia vaporizer for preparing gaseous ammonia suitable for use in treating row crops.

In summary, this invention involves a portable ammonia vaporizer so designed as to vaporize liquid ammonia completely and superheat the resulting gas to about 0–175° C. without cracking appreciable quantities of ammonia. Hot combustion gases, prepared by burning liquid petroleum gas (or other suitable fuel, e.g., gasoline) are mixed with self-inspirated tempering air in such a ratio that, with the accompanying radiant heat losses, the temperature of the ammonia in the vaporizer is maintained below about 175° C., thereby avoiding higher temperatures conducive to the thermal cracking of ammonia. The temperature of the superheated ammonia exiting the vaporizer is maintained in the preferred range of about 35–100° C. by adjusting the rate that fuel is fed to the burner, thereby regulating the amount of heat supplied to the system. This invention makes it possible to feed ammonia vapor continuously or intermittently from the vaporizer to the hoods of an ammonia defoliator at constant or variable rates ranging from about 5 pounds per acre upwards to about 150 pounds per acre, as the hoods are moved lengthwise along crop rows, thereby making it practical to add ammonia vapor to row crops for such diverse purposes as defoliation and foliar fertilization.

In the drawings:

FIGURE 1 is a flow diagram of my ammonia vaporizer system.

Figure 2:
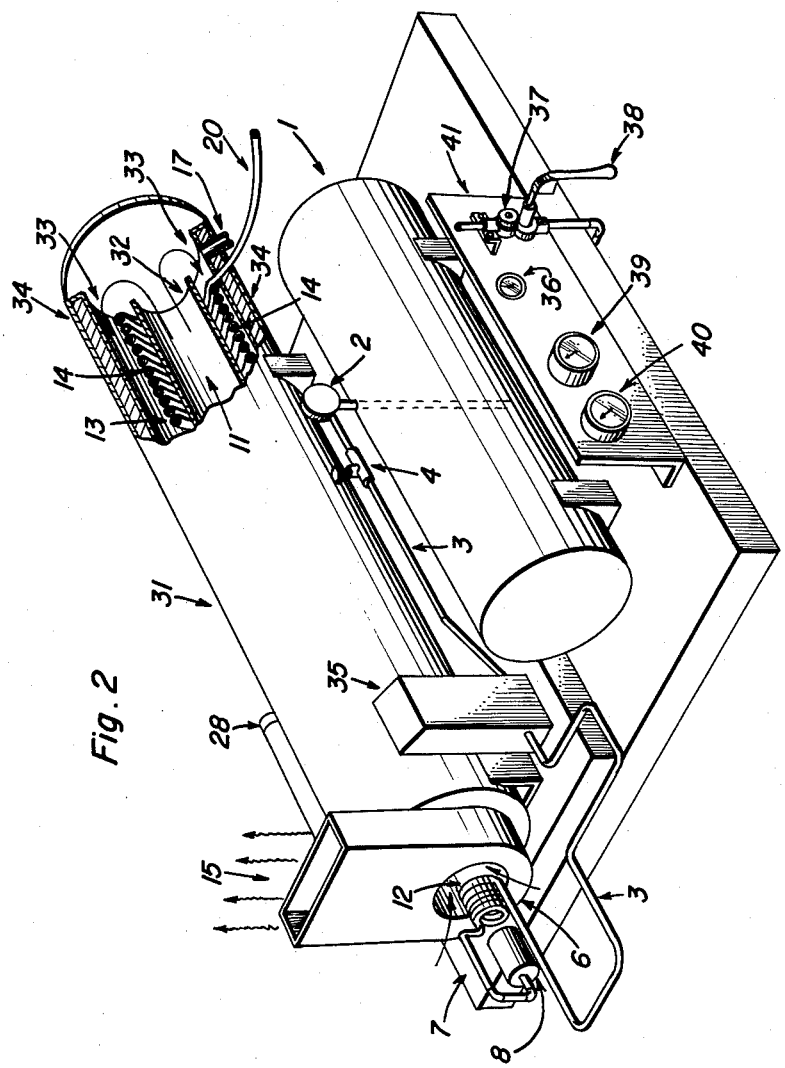

The equipment shown schematically within the phantom line of FIGURE 1 is assembled as a self-contained "package" vaporization unit which is shown perspectively in FIGURE 2. This unit plus an ammonia cylinder, necessary feed lines, and auxiliary equipment can be mounted on any suitable carrier equipped with hoods for treating row crops.

Figure 3:
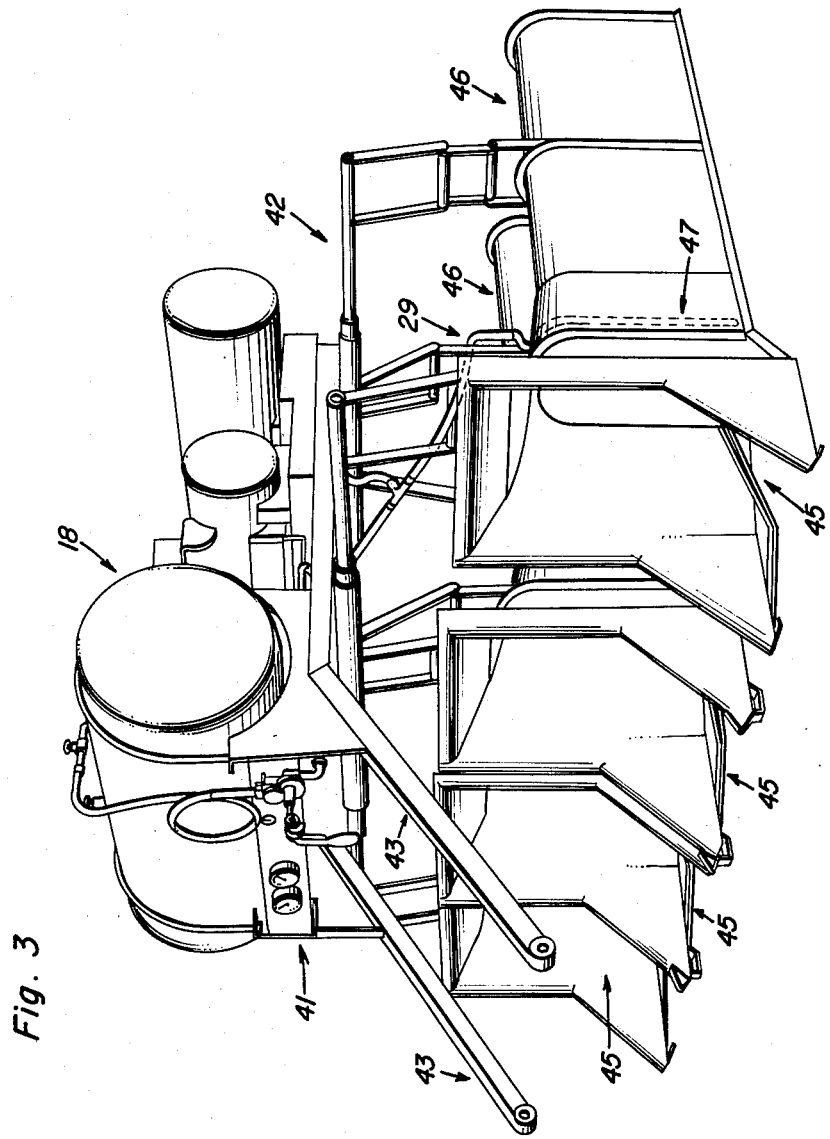

FIGURE 3 shows my ammonia vaporizer plus an ammonia cylinder mounted on a pull-type carrier equipped with four crop treating hoods. This device is pulled along crop rows (not shown) by a conventional farm tractor (not shown) while ammonia vapor from my vaporizer is fed into the hoods of said device.

Although my vaporizer will operate satisfactorily while delivering superheated ammonia vapor at temperatures varying from about 0–175° C., I prefer to operate over the range of about 35–100° C., because defoliation is less efficient at lower temperatures and desiccation of plant parts can result if the ammonia vapor is too hot when it contacts the plants.

To reduce the cost of my vaporization unit, I prefer to use manual control to regulate the rates at which fuel and anhydrous liquid ammonia are fed to the system. However, automatic control devices of standard design can be used to regulate both temperature and ammonia feed rate.

In the ammonia defoliation of row crops it is extremely important to deliver ammonia at a controlled rate and at a controlled temperature. Otherwise defoliation will be erratic and overly expensive and desiccation of plant tissue can result. The advantages of defoliation equipment capable of these functions will be best understood in light of the present status of chemical defoliation, as discussed below.

Leaves on the stalks of row crops and on weeds growing with these crops are a handicap to harvesting, because leaves and leaf juices interfere with the functioning of mechanical harvesters and cause the accumulation of trash in the harvested crops. As a result, considerable interest has developed in the defoliation of row crops before harvesting. Defoliation of cotton has received the most attention with the result that cotton defoliation has become a matter of great economic importance. The defoliation of other row crops, especially soy beans—including weeds growing in the bean fields, is receiving increased attention.

In the commercial growing of cotton it has been necessary to make several pickings by hand, because all the bolls do not ripen at the same time. Bolls on the lower branches mature first, and opening of bolls on the upper branches occurs over a period of several weeks after the lower bolls have matured. In recent years, the shortage and cost of labor and the trend toward large scale farming have made mechanical picking very desirable. The presence of leaves on cotton stalks is an especially severe handicap to mechanical harvesting, because leaves present a barrier which hampers the picking means from reaching the bolls, and adds trash to the cotton. Also, if green leaves are rubbed against the cotton, juices are exuded and stain the cotton fibers. Thus, it is highly desirable that the leaves be removed from cotton plants before harvesting the crop mechanically.

If the leaves of a plant are injured by physical or chemical means, or if they are cut leaving stems, abscission layers of cells grow across the petiole bases causing the leaves or leaf stems to drop off. In the case of cotton, the formation of abscission layers disrupts the metabolic processes of the plants and causes the upper bolls to ripen and open more rapidly, thereby facilitating the use of mechanical pickers.

Although cotton defoliation is of special value when mechanical pickers are used, it also aids hand picking, because the dew dries out quicker, permitting the pickers to get an earlier start, and it is easier for the pickers to locate the bolls and gather the cotton when the plants are free of leaves.

Leaf removal also helps control the insect count. This is particularly true in respect to aphids, leaf worms, and boll weevils. Since defoliation speeds up cotton harvesting, the stalks can be destroyed earlier. This is advantageous in areas that have plow-up programs to aid in the control of boll weevils.

To obtain the best results with cotton, the boll load should be heavy and vegetative development stopped. Normally, about 50–70% of the bolls should open before a chemical defoliant is applied. Little damage to the crop will occur if most of the bolls are full size and firm to the touch at the time of defoliation. If the bolls are not full size and are soft when the plants are defoliated, the yield will be reduced and seed and fiber quality will be lowered.

At the present time most defoliants are contact herbicides which cause defoliation when applied at low rates. At slightly higher rates these materials produce rapid desiccation and killing of leaves, stems, and other plant parts before the abscission layers form. Desiccation is very objectionable with cotton, because leaves of dead plants set so firmly that few of them drop, boll development ceases, abscission of the bolls occurs, and the plant stems become brittle so that bolls are easily broken off and lost during harvesting. When legumes are desiccated, large numbers of seed pods drop off. Cyanamide compounds, organic phosphorous compounds, arsenic compounds, and chlorates are the principal defoliants used at the present time. Cyanamide is difficult to use because it requires a considerable amount of dew or other moisture. Practically no defoliation occurs when this material is applied in the absence of moisture. Arsenic and phosphorus compounds are poisonous, and chlorates leave phytotoxic residues in the soil. Furthermore, irregular defoliation is obtained with these materials, and defoliation is seldom more than about 60–75% complete. There is known the treatment of cotton plants with hot combustion gases to produce defoliation. A process of this type is extremely difficult to use, because the temperature must be controlled very closely. If the gas is too cool, little or no defoliation will be obtained; if it is too hot, desiccation or boll abscission will result. Various devices have been suggested for mechanically removing foliage from cotton plants. Although the use of such devices increases the efficiency of cotton picking to a limited extent, only partial defoliation has been obtained with these machines.

It is an object of the present invention to provide a means for defoliating row crops after the crop is made, whereby the plants and weeds growing with them will be rendered substantially free of leaves so that the crops may be harvested mechanically or by hand to yield products that contain little trash and are free of leaf stain.

It has recently been discovered that contact with gaseous ammonia will cause the defoliation of plants. However, previous attempts to defoliate plants with gaseous ammonia have been characterized by spotty results, an average defoliation of about 75%, and high ammonia usage accompanied by a high ammonia loss. In addition to constituting a danger and annoyance to the operator requiring him to use a fresh air mask and protective clothing, the escaping ammonia was a hazard to all animal life and a hindrance to defoliation. In the experimental work leading to the design of this heat exchanger, it was found that ammonia enters plants through the stomata. It was also found that ammonia in concentrations too low to produce defoliation will close the stomata, thus rendering the exposed plants insensitive to defoliation when contacted subsequently with ammonia in concentrations sufficiently high to defoliate normal plants. It was also found that the direct application of relatively large droplets of liquid ammonia to plant leaves burns the leaves at the point of contact but does not produce appreciable defoliation.

Ammonia, $NH_3$, is an article of commerce. Although this compound is a gas at normal temperature and pressure, it is stored and transported as a liquid in pressure vessels. Ammonia melts at $-77.70°$ C. and boils at $-33.35°$ C. at an absolute pressure of one atmosphere; its heat of vaporization is 283.6 calories per gram at 20° C. When heated to a sufficiently high temperature, ammonia dissociates into hydrogen and nitrogen. The temperature at which dissociation commences depends upon the composition of the material with which the ammonia is in contact. In experimental work leading to the design of this heat exchanger, it was found that ammonia is stable in the presence of carbon steel at temperatures up to about 400° C., which is well above the maximum temperature (ca. 175° C.) occurring in the tubes of my vaporizer. The results of tests made with this vaporizer show that less than 0.1 mole percent of the ammonia feed is cracked to $N_2$ and $H_2$ when superheating the ammonia vapor to about 175° C.

It was discovered in work leading to this invention that previous poor defoliation was caused, in part, by improper temperature control in the ammonia vaporizing system. At times the temperature was too high, with the result that a considerable portion of the ammonia was cracked to yield hydrogen and nitrogen which do not cause defoliation. At other times the vaporizer's temperature was too low. This resulted in incomplete vaporization of ammonia with the concomitant feeding of part of the ammonia as large drops of liquid which burn leaves at the points of contact but do not produce defoliation.

I have designed an ammonia vaporizer which has overcome these difficulties. My invention permits the continuous or intermittent feeding of gaseous ammonia into a contacting device at constant or variable rates ranging from as low as about 5 pounds per acre to upward of about 150 pounds per acre into the contacting hoods of a conventional ammonia defoliator equipped with 1–4 hoods while the defoliator is moved lengthwise along crop rows at speeds of about 2–5 miles per hour. The ammonia vaporizer of this invention, unlike those of the prior art (see page 32 of the Southwestern Edition of the "Farm Journal," August 1961), is light in weight and does not require a blower with an engine to drive said blower; neither does it require the air-gas ratio valves and the spark ignition system of the conventional tempered air vaporizer. These novel construction features of my invention reduce the weight and space requirements, cost, and necessary operating know-how to levels within the range of the average farmer, thereby making the defoliation of row crops with ammonia economically attractive. The flexibility of my invention makes it practical to add ammonia vapor to row crops, on a commercial scale, for such diverse purposes as defoliation and foliar fertilization. Furthermore, this flexibility of control is necessary, because the ammonia feed must be cut off when turning at the end of rows or when stopping to service or repair the contacting system. So far as is known, there is no device available in the prior art for accomplishing these results.

The method which I prefer for defoliating row crops with ammonia comprises passing superheated gaseous ammonia from my ammonia vaporizer into an elongated contacting zone, or hood, of conventional design while passing this device lengthwise along the crop row when the stomata are open. The plants are thereby exposed to a gas comprising a defoliating atmosphere of ammonia. Ammonia rates of about 40–120 pounds per acre have been satisfactory for defoliating row crops, while rates less than about 30 pounds per acre have failed to produce acceptable defoliation. Application at slightly lower rates, e.g., about 20 pounds or less per acre, has been found to shock plants thereby closing their stomata and rendering the shocked plants insensitive to defoliation. This period of insensitivity may last for 6–10 hours or longer. When defoliating cotton plants with gaseous ammonia under optimum conditions, leaves on plants exiting the contacting zone are considerably lighter green than those of untreated plants. This indicates that ammonia attacks the chlorophyll. Within about 15–30 minutes the treated leaves develop a bronze color, and in about 2–6 hours they feel dry when touched. After 8–14 days substantially all of the leaves have dropped from the plants. This treatment does not kill the plants; new leaves develop in a few weeks.

FIGURE 1 is a flow diagram of my ammonia vaporizer. Liquid petroleum gas or other liquid fuel, e.g., gasoline, passes from tank 1 through shut-off valve 2, line 3, pressures regulator 4, and cut-off valve 5 to coil 6 then via line 7 to burner 8. The liquid fuel is vaporized in coil 6 by heat from the flame 9 produced by burner 8. Air necessary for combustion enters burner 8 at 10. Combustion gases from flame 9 travel through chamber 11 where they are cooled by tempering air inspirated through opening 12. Said tempering air coupled with heat lost by radiation reduces the temperature of the gas in chamber 11 to about 600° C. This hot combustion gas-air mixture passes from chamber 11 to annular space 13 where it passes over coil 14 (vaporizing the ammonia therein) and exits from the system via vent 15. The exit temperature of combustion gas-air mixture is about 260–

300° C. Water vapor present in the combustion gas-air mixture condenses on coil 14 and drips into space 16 from which it escapes via vent 17. Flashing liquid anhydrous ammonia from cylinder 18 passes via shut-off valve 19, line 20, cut-off valve 21, and flow control valve 22 to coil 14 wherein the liquid ammonia is vaporized with heat supplied by burner 8. Temperature controller 23 is a high temperature cut-off which activates cut-off valve 5 to stop the main flow of fuel to the burner if the ammonia temperature exceeds about 100° C. This prevents the system from overheating and cracking ammonia in coil 14; it also prevents the desiccation of plant tissues by hot ammonia vapor. When valve 5 is closed by temperature controller 23, a small amount of fuel continues to pass via valve 24, orifice 25, and by-pass line 26 to line 3 (down stream of cut-off valve 5) and then through coil 6 and line 7 to burner 8. This is a safety feature which maintains a small flame in the burner while the heat exchanger is being cooled. When the system has cooled, temperature controller 23 opens cut-off valve 5; then the small flame maintained at burner 8 functions as though it were a pilot light, thereby preventing the possibility of a dangerous accumulation of unburned fuel in the heat exchanger. Ammonia vapor passes from coil 14 through line 27 to header 28, and then via line 29 and line 30 to ammonia ports, one of which is shown at 47, located in the plant-contacting hoods, or elongated contacting zones 46, of an ammonia defoliator (see FIGURE 3).

FIGURE 2 shows, in perspective, the apparatus enclosed by the phantom line of FIGURE 1. Construction of heat exchanger 31 is also shown in more detail in FIGURE 2. The ammonia vaporizing coils 14 are mounted in annular space 13 between tube 32 and shell 33. As shown in the drawings, the vaporization coils consist of one tier of coils spiralled around tube 32 in the annular space between said tube and shell 33. Said tube and said shell can be positioned concentrically. For purposes of safety and to reduce heat loss by radiation, the external surface of shell 33 is covered with a coating of insulating material 34 of the type used to insulate high temperature steam lines. Valve 24, cut-off valve 5, orifice 25, and by-pass line 26 (not shown in FIGURE 2 but shown schematically in FIGURE 1) can be housed in compartment 35. Fuel pressure indicator 36, fuel pressure regulator 37, burner shut-off 38, ammonia header temperature indicator 39, and ammonia header pressure indicator 40 can be mounted on removable control panel 41.

FIGURE 3 shows my ammonia vaporizer plus an ammonia cylinder 18 and other auxiliary equipment mounted on pull-type carrier 42 which can be attached to a conventional farm tractor (not shown) via arms 43. The mouths 45 of four ammonia crop-contacting hoods are shown in FIGURE 3; the body sections 46 of two hoods are also shown. Said hoods are also mounted on carrier 42. Ammonia vapor from an ammonia header (not shown) passes via line 29 to ammonia ports 47 located in the fore portions of the body sections 46 of the hoods just behind the juncture of mouths 45 and body sections 46. For convenience of operation, control panel 41 can be mounted on the front portion of pull-type carrier 42 where it will be readily accessible to the operator.

Work leading to the design of my apparatus showed that carbon steel is a preferred material for use in constructing coils for the heat exchanger, because it is inexpensive, easy to fabricate, and it has practically no catalytic effect on the thermal cracking of ammonia at temperatures ranging up to about 400° C. Hence, it was decided, as a result of this discovery, to construct the ammonia vaporizer's coil from carbon steel. Actual use of the apparatus has confirmed my expectation that neither ammonia cracking nor scale formation is a problem when vaporizing ammonia in my apparatus. Other materials suitable for use in constructing coils for the heat exchanger include, but are not limited to, Hastelloy C, Nionel, Monel, Inconel, and Hastelloy B.

Preferred embodiments of my invention include the use of type 302 stainless steel as material for constructing inner tube 32 of FIGURE 2, outer shell 33 of FIGURE 2 and combustion gas outlet 15 of FIGURE 2. However, other metals including types 304 and 316 stainless steel, Hastelloy C, Nionel, Monel, Inconel, or Hastelloy B can be used.

I prefer to mount my vaporizer on a pull-type carrier equipped with 2–4 crop-treating hoods, but 1–6 hoods can be used.

My invention is further illustrated by the following examples which are illustrative only and which are not intended to limit the scope of the invention.

Example I

The equipment used was that illustrated in FIGURE 3. Flashing liquid ammonia was fed into the vaporizer at a rate of about 70 pounds per acre while moving the device along cotton rows at about 5 miles per hour. The ammonia vaporized smoothly and substantially completely. Cracking of ammonia was not a problem for the temperature control was such as to substantially preclude the thermal decomposition of ammonia. No visible droplets of liquid ammonia were observed in vapor fed into the hood, and leaves of plants exiting the hood were lighter green than those of untreated plants. Most of the treated leaves turned bronze within ½ hour after being contacted with ammonia; within about 4 hours the treated leaves felt dry when touched. Defoliation was ca. ≅94%, i.e., at least about 94%, complete 9 days after treatment.

Example II

This run was made to determine the efficiency of our ammonia vaporizer at an ammonia rate known to be too low to defoliate cotton. Flashing liquid ammonia was fed into the vaporizer at the rate of about 8 pounds per acre while moving the apparatus along cotton rows at about 4 miles per hour. Vaporization was substantially complete and temperature control substantially precluded cracking. As expected, no defoliation resulted from this treatment. The effect was therefore a closely controlled foliar fertilization.

Example III

Using the apparatus illustrated in FIGURE 3, a field of soy beans infested with cockleburs was treated with ammonia. The ammonia feed rate was about 80 pounds per acre while the apparatus moved along the crop rows at 4 miles per hour. Vaporization was observed to be substantially complete, and temperature control substantially precluded cracking of the ammonia. Leaves of bean plants exiting the hoods could not be distinguished by visual observation from the leaves of untreated plants. Defoliation of both beans and weeds was ca. ≅96% complete about 8 days after applying the ammonia.

I claim:

In an ammonia defoliator comprising vehicle mounted crop-contacting hoods, liquid ammonia source, liquid ammonia vaporizing means, and means for delivering said ammonia vapor to said hoods, the improvement in which the liquid ammonia vaporizing means comprises, in combination:

(a) a heat exchanger of unitary construction comprising a horizontal cylindrical shell having an exit,
(b) a tube fitting within the shell and having an entrance and a discharge port, said port being located within said shell,
(c) said tube and said shell having an annular space between them,
(d) ammonia vaporizing coils in said annular space, said coils having an entrance and an exit, means connecting said entrance with said ammonia source, means connecting said exit with said ammonia delivering means, (e) a burner adapted to deliver combustion gas to said tube, said burner communicating with said tube, and
(f) means for inspirating ambient air to said tube said means communicating was said tube.

References Cited by the Examiner
UNITED STATES PATENTS

| | | | |
|---|---|---|---|
| 548,941 | 10/1895 | Wilder | 122—250 |
| 1,723,955 | 8/1929 | Shepherd. | |
| 1,980,301 | 11/1934 | Stewart | 122—248 |
| 2,158,735 | 5/1939 | Vigneault | 122—248 |
| 2,288,569 | 6/1942 | Mason. | |
| 2,612,760 | 10/1952 | Baggette. | |
| 2,675,682 | 4/1954 | Dobson | 62—50 X |
| 2,682,728 | 7/1954 | Nisbet. | |
| 2,977,715 | 4/1961 | Lindsay | 47—1 X |
| 3,095,298 | 6/1963 | Fisher. | |

FOREIGN PATENTS

| | | |
|---|---|---|
| 311,597 | 3/1919 | Germany. |
| 536,585 | 5/1941 | Great Britain. |

OTHER REFERENCES

Hansen, C. M.: Engineering Principles in Handling Liquid Materials, in Agricultural Engineering (Magazine), 39 (9): 546–551, September 1958.

FREDERICK L. MATTESON, JR, *Primary Examiner.*
THEODORE G. CRAVER, *Examiner.*

UNITED STATES PATENT OFFICE
CERTIFICATE OF CORRECTION

Patent No. 3,238,667

March 8, 1966

Herman A. Remmert

It is hereby certified that error appears in the above numbered patent requiring correction and that the said Letters Patent should read as corrected below.

In the grant, lines 2 and 3, for "assignor to W. R. Grace & Co., of New York, N. Y., a corporation of Connecticut," read -- assignor, by mesne assignments, to Chevron Research Company, a corporation of Delaware, --; line 12, for "W. R. Grace & Co.," read -- Chevron Research Company, --; in the heading to the printed specification, lines 4, 5 and 6, for "assignor to W. R. Grace & Co., New York, N. Y., a corporation of Connecticut" read -- assignor, by mesne assignments, to Chevron Research Company, a corporation of Delaware --.

Signed and sealed this 5th day of September 1967.

(SEAL)
Attest:

ERNEST W. SWIDER
Attesting Officer

EDWARD J. BRENNER
Commissioner of Patents